Patented Mar. 12, 1935

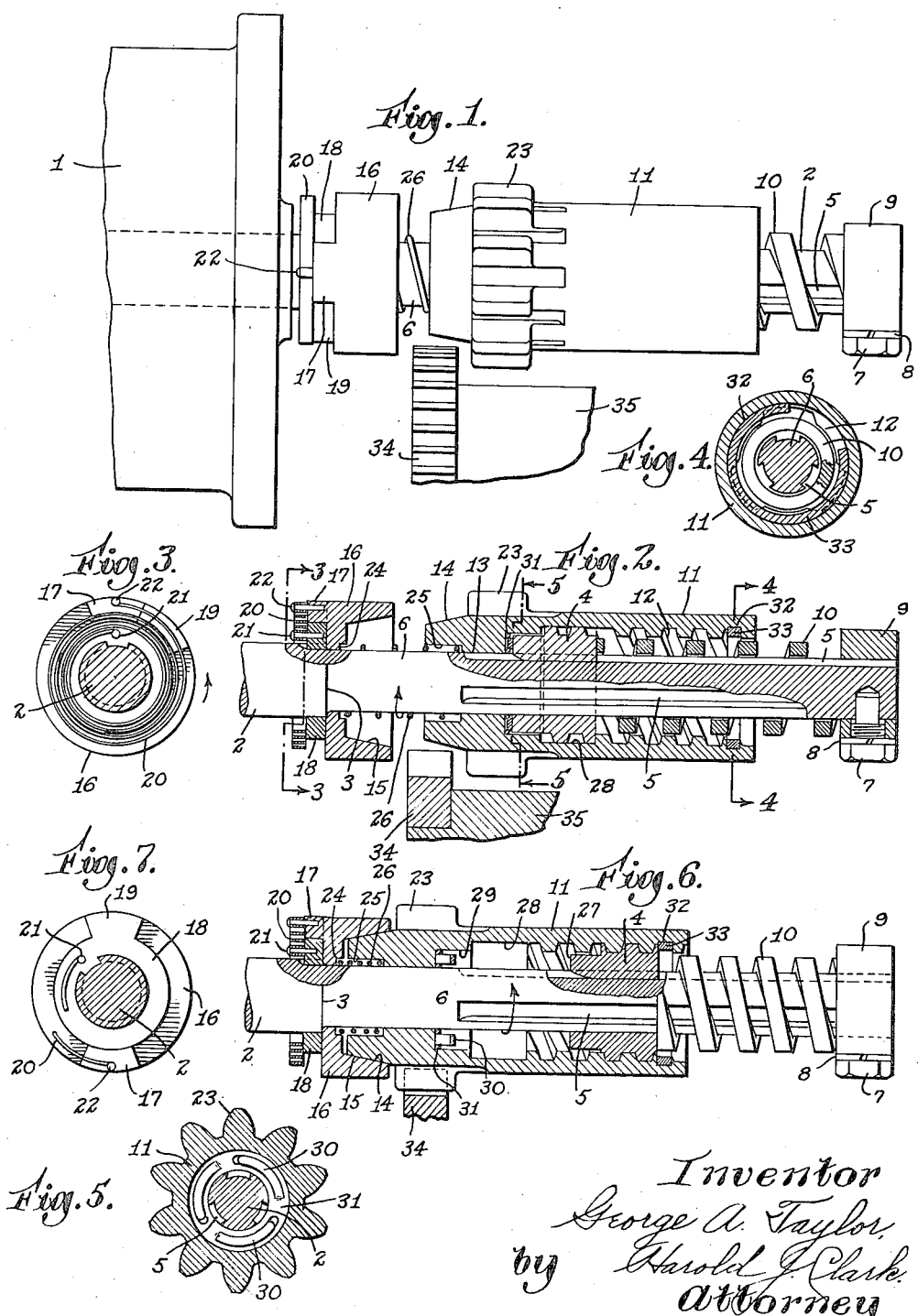

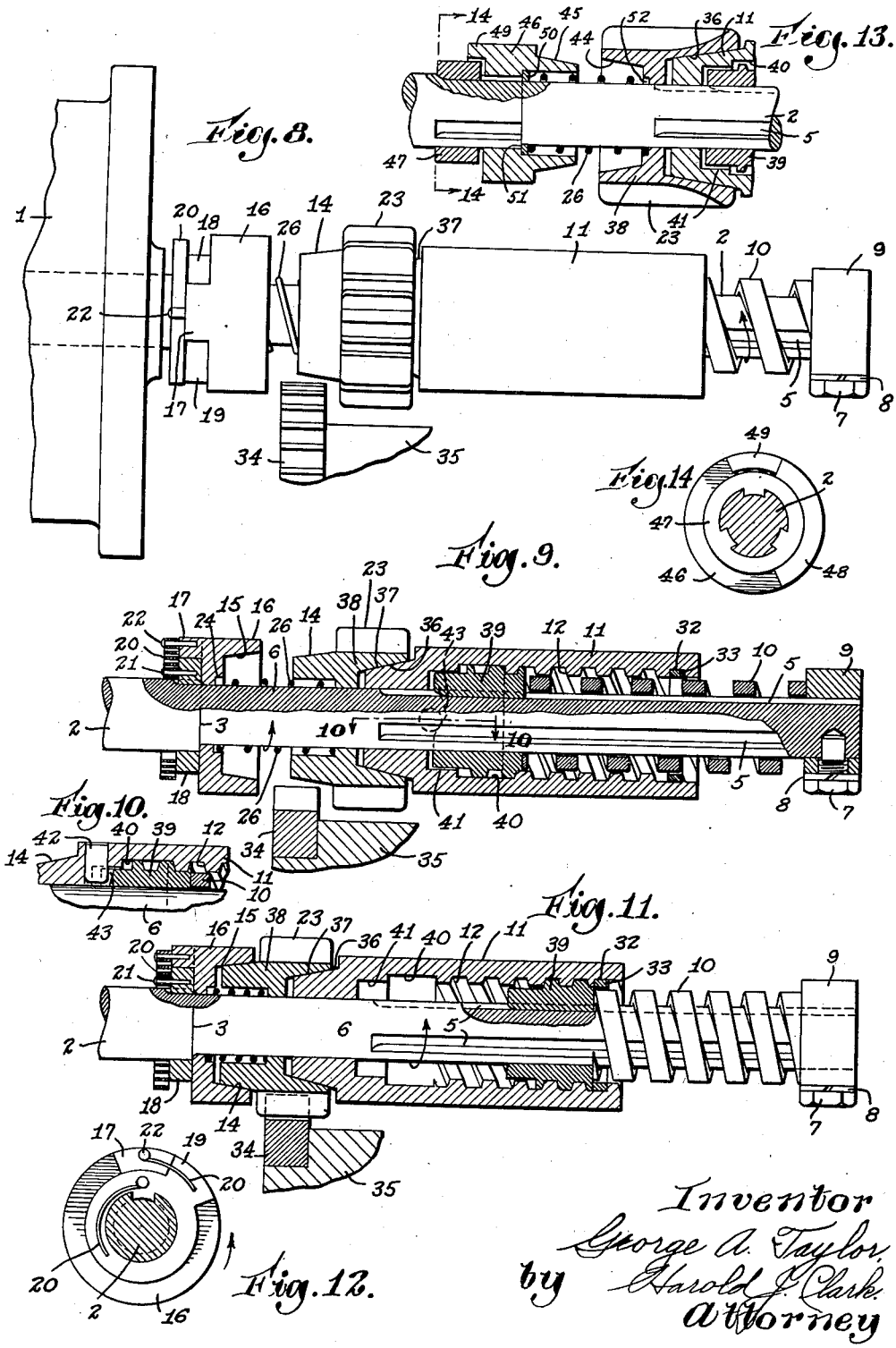

1,994,409

UNITED STATES PATENT OFFICE 1,994,409

ELECTRIC STARTER

George A. Taylor, Hyde Park, Mass.

Application July 30, 1932, Serial No. 626,617

25 Claims. (Cl. 74—7)

My present invention relates to starting devices, and more particularly to a novel and improved electrical starter for internal combustion engines.

An important object of the present invention resides in the provision of a starting device which is extremely simple and inexpensive to manufacture and assemble and which at the same time is positive and highly efficient in its operation.

Another and important object of this invention resides in the provision of a starting device in which the driving member or pinion is moved into engagement with a cooperating engine part, namely, the fly wheel, with no substantial torque imposed on said pinion.

A further important object of my invention consists in means, operative after interengagement of the driving pinion and fly wheel gear, to develop or build up torque on said pinion to a predetermined fixed limit, but not beyond said limit, thus obviating the likelihood of injury or damage to either the pinion or the fly wheel gear in the event of backfiring or other abnormal engine conditions.

Still a further feature of the present invention resides in the provision of a combined stop collar and friction clutch device mounted on and rotatable with the armature shaft, but inoperative until engagement therewith by a complemental friction clutch member or surface associated with the driving pinion.

Another feature of the invention resides in the provision of a second friction clutch, interposed between the driving pinion and the means to effect axial movement of said pinion with respect to the armature shaft.

A still further object of the present invention resides in the fact that the two independent friction clutches hereinbefore mentioned are of different values. In other words, the torque transmitting properties of each of these clutches differs with respect to each other, because of the angle of inclination of the respective cooperating clutch members. The presence of the secondary friction clutch provides an added safety factor in that slippage will occur between the cooperating faces of the secondary friction clutch prior to slippage between the contacting faces of the primary clutch, thus still further insuring against damage or injury to the starting device or its associated members.

The device of the present application is in that generic class of starting devices known as inertia starters, and is equally applicable to either the inboard or outboard type of starter.

While I have illustrated the use of cone clutches for both the primary and secondary friction clutches in the drawings of the present application, it will be appreciated and understood that I do not limit myself to this particular type of clutch, in either instance, as it is within the scope of my present invention to utilize the cone clutch illustrated, or a single disc friction clutch, or a multiple disc friction clutch, in either or both locations.

Other objects and features of the present invention reside in the particular construction and arrangement of the parts of my novel starter, and all of the above, together with other objects and features of the invention, details of construction, combinations of parts, and advantages, will be hereinafter more fully pointed out, described and claimed.

Referring to the drawings, illustrating preferred embodiments of the present invention, Fig. 1 is a side elevation illustrating my invention embodied in an inboard starting device;

Fig. 2 is a longitudinal sectional view of my novel starter;

Fig. 3 is a vertical sectional view on the line 3—3 of Fig. 2;

Fig. 4 is a vertical sectional view on the line 4—4 of Fig. 2;

Fig. 5 is a vertical sectional view on the line 5—5 of Fig. 2;

Fig. 6 is a longitudinal sectional view of the device in driving position;

Fig. 7 is a vertical sectional view similar to Fig. 3 at the time of disengagement of the primary clutch surfaces;

Fig. 8 is a side elevation of a modified starter;

Fig. 9 is a longitudinal sectional view of the starter illustrated in Fig. 8;

Fig. 10 is a fragmentary sectional view on the line 10—10 of Fig. 9;

Fig. 11 is a longitudinal sectional view of the starter of Fig. 9 in driving position;

Fig. 12 is a vertical sectional view similar to Fig. 3, but with the spring broken away for clarity of illustration;

Fig. 13 is a fragmentary longitudinal sectional view illustrating a modified clutch and driving collar arrangement; and Fig. 14 is a vertical sectional view on the line 14—14 of Fig. 13.

Referring now to the drawings, for a particular description of the invention, its construction, assembly and operation, and particularly to Figs. 1 to 7 inclusive, 1 designates a conventional starter motor provided with an armature shaft 2 projecting outwardly beyond one end of the motor 1. This armature shaft 2 is reduced in diameter from the point 3 to its outermost end, and splined to said reduced portion is a control screw 4, keyways 5 extending but partially therealong, leaving a smooth portion designated at 6. Fixed to the outer end of the shaft 2 by a cap screw 7 and lock washer 8 is a collar 9, and interposed between the inner face of said collar 9 and the screw 4 is a coiled spring 10. I provide a sleeve 11, internally threaded as clearly illustrated in the drawings at 12, said threads 12 being adapted to mesh with the screw 4 during operation of the device, and the sleeve 11 having a smooth bore 13 adapted to slide along the surface of the reduced portion of the shaft 2, including the smooth surface 6.

The inner end of the sleeve 11 is tapered, as at 14, this tapered face comprising one portion of a cone clutch, the other portion of said clutch being the conical inner face 15 of a collar 16 butting against the shoulder 3 and being provided with a lug 17. A second collar 18 is keyed to the shaft 2, in tandem relationship with the collar 16, said collar 18 being rotatable with the armature shaft 2 and having a driving lug 19 engaging the lug 17 to effect rotation of the collar 16 simultaneously with rotation of the collar 18. The lug 17 is held against the driving face of the lug 19 by means of a coiled spring 20 during normal conditions. One end of this coiled spring 20 is fixed to a post 21 projecting from the collar 18 and the other end of said spring is fixed to a post 22 projecting from the lug 17.

From an inspection of Fig. 3, therefore, it will be apparent that under all normal conditions the spring 20 will tend to urge the lug 17 against the driving face of the lug 19. The sleeve 11 is provided with a driving pinion comprising the teeth 23, here illustrated as being formed integral with said sleeve. The collar 16 is provided with a recess 24, and the forward end of the sleeve 11 is also provided with a recess 25, and surrounding the smooth portion 6 of the shaft 2 and having its ends housed in the recesses 24 and 25 is a relatively light coiled spring 26, the normal tendency of this spring 26 being to force the sleeve 11 in a direction away from the collar 16.

The forward end of the control screw 4 is reduced in diameter, and is smooth, as illustrated at 27, and the sleeve 11 is provided with communicating recesses 28 and 29, of varying diameters, the recess 28 accommodating the threaded portion of the screw 4 and the recess 29 accommodating the smooth reduced portion 27, when the device is in normal or retracted position as illustrated in Fig. 2, the threads on the screw 4 being at that time out of engagement with the threads 12 in the sleeve 11. When in normal retracted position, the screw 4 is urged into the recesses 28 and 29 by the combined action of the springs 10 and 26, and, when the smooth portion 27 is seated in the recess 29, it is against the tension of the leaf springs 30 which are struck up or formed on the disc or washer 31. Thus, these leaf springs 30 are depressed when the device is in the normal retracted position of Fig. 2, the tendency of these leaves 30 being to urge the screw 4 against the threads 12.

Seated in the annular groove 32 adjacent to the rear end of the sleeve 11 is a split ring 33 which intersects the threads 12, as clearly shown.

The pinion 23 is positioned in register with the gear 34 on the engine fly wheel 35, the teeth of said gear being engaged by the pinion 23 on operation of the starting device.

The operation of the novel starting device illustrated in Figs. 1 to 7 inclusive is simple, and will be readily understood by those skilled in this art, being briefly described as follows:

The motor 1 being energized, will effect a rotation of the armature shaft 2 and hence of the screw 4 splined thereon. The sleeve 11 will be restrained from rotation by its inertia, and the screw 4, being urged against the threads 12 by the leaf springs 30, as soon as said screw registers with said threads, will effect an axial movement of said sleeve 11 along the shaft 2, to the left, as viewed in Fig. 2, said sleeve carrying therewith the pinion 23. When the pinion 23 has meshed with the teeth of the fly wheel gear 34, the clutch face 14 will be in engagement with the clutch face 15 on the collar 16, but will slip therein, as the collar 16 is being rotated, through the medium of the collar 18, at the same speed of rotation as the shaft 2, but the engagement of these two clutch faces will prevent further axial movement of the sleeve 11 and pinion 23 in the direction above mentioned.

Thereupon, rotation of the armature shaft 2 being continued, the screw 4 will be threaded in the threads 12 of the sleeve 11, feeding said screw to the right, as viewed in Fig. 2, against the tension of the coiled spring 10. As the said spring 10 is compressed, between the screw 4 and collar 9, friction between the clutch faces 14 and 15 will be increased, this friction progressively being increased to a driving torque before the screw 4 engages the stop ring 33, at which engagement said device will have a positive drive on said pinion.

At this point, however, and as clearly illustrated in Fig. 6, the spring 10 is not completely compressed, thus resulting, at all times, in a resilient pressure against the sleeve 11. The torque developed by this operation will be sufficient to rotate the fly wheel 35 under any normal conditions of compression, or the like, but upon starting of the engine, which will greatly increase the speed of rotation of the flywheel 35, the pinion 23 will rotate the sleeve 11 and hence the screw 4 in the opposite direction, disengaging the pinion 23 from the fly wheel gear 34, this disengagement being assisted by the coiled spring 26. Axial rebound of the device is obviated by the fact that once the parts, after disengagement, have reached the position illustrated in Fig. 2, the screw 4 will then be housed within the recesses 28 and 29, and the sleeve 11 will simply spin therearound until its momentum ceases. Also, upon starting of the engine, and increasing the speed of the gear 34 over the speed induced by the pinion 23, the collar 16 will be carried around the shaft 2 at a greater rate of speed than the speed of rotation of the shaft 2 and collar 18. This increased speed of the collar 16 is but a momentary travel, resulting in a separation of the lugs 17 and 19, until said lugs are in substantially the position illustrated in Fig. 7, by which time the clutch faces 14 and 15 will have been disengaged, and thereupon the spring 20 will return the lug 17 to its normal position as illustrated in Fig. 3, in contact with the driving face of the lug 19.

As previously stated, with the device under the maximum torque developed, the spring 10 is not under full compression. This fact is also true in the case of end butting between the forward face of the pinion teeth 23 and the adjacent face of the teeth on the fly wheel gear 34. Thus, even in the case of end butting, the pinion 23 is urged against the fly wheel gear 34 resiliently, and not under a rigid metal-to-metal contact. This is a further factor of safety in my novel device, and eliminates likelihood of injury to either the pinion 23 or fly wheel gear 34 should end butting occur.

I believe that the starting device illustrated and above briefly described is novel, and I have therefore claimed the same broadly in the present application.

Referring now to Figs. 8 to 12 inclusive, I have illustrated a modification wherein the sleeve 11 is provided, at its forward end, with a tapered face 36, this face 36 comprising a clutch face, and cooperates with the clutch face 37 on the pinion 38. Otherwise the parts of my novel device are preferably exactly as illustrated in Figs. 1 to 7 inclusive, including the clutch faces 14 and 15, which I herein term the primary clutch, the faces 36 and 37 constituting a secondary clutch. From an inspection of the drawings it will be apparent that the angle of inclination of the clutch faces 36 and 37 is obtuse relative to the angle of inclination of the clutch faces 14 and 15. The pressure imposed on these primary and secondary clutches, therefore, being the same, it stands that there will be less friction developed between the faces 36 and 37 than between the faces 14 and 15. Thus, in the event of backfire, for example, the pinion 38 will not exert a rotating force on the sleeve 11 and its component parts, but will spin therearound.

Likewise, on disengagement of the starter device after starting of the engine, said disengagement being assisted, of course, by the coiled spring 26, there will be no tendency to rebound axially, this tendency being overcome by the slippage between the clutch faces 36 and 37, and the resultant spinning of the pinion 38 until cessation of its momentum. This modified form of starter, incorporating a plurality of clutches such as the primary and secondary clutches above described, thus presents a still further safety factor which will be readily understood and appreciated by those skilled in this art.

While this feature of the double clutch arrangement is applicable to the structure of Figs. 1 to 7 inclusive, the presence of the secondary clutch obviates the necessity of providing means whereby the sleeve 11 may spin around the screw 4. Therefore, to simplify the construction of my novel starter when the dual clutch feature is embodied therein, the screw 39 is always at least partially in contact with the threads 12 on the interior of the sleeve 11. Thus, while a portion of the screw 39 is partially housed within the recesses 40 and 41, the remainder of the threads on said screw will be in engagement with the threads 12. This fact of constant engagement of the screw and threads, when coupled with my novel dual clutch feature, simplifies the manufacture of my novel starter, while retaining its full efficiency. In order to further prevent rotative rebound of the sleeve 11 after disengagement, I provide, in said sleeve, a pin 42, said pin, when the parts are in normal retracted position, illustrated in Fig. 9, being seated in a substantially V-shaped recess 43 on the smooth end of the screw 39. Thus, on return of the parts to normal retracted position, there will be no shock or blow imparted on engagement of the screw 39 with the pin 42, because of the presence in said screw of said wedge-shaped recess.

Referring now to Figs. 13 and 14, there is therein illustrated a still further slight modification of my invention. In this form, the pinion 38 is provided with a female clutch face 44 adapted to engage the male clutch face 45 on the collar 46. Keyed to the armature shaft 2 is a collar 47 having thereon a driving lug 48 in engagement with the lug 49 projecting from the collar 46 when the parts are in driving position. The collar 46 is freely mounted between the washer 50, bearing against the shoulder 51 on the shaft 2, and the collar 47 which is keyed to said shaft. The coiled spring 26, in this form of the invention, bears between the washer 50 and the recess 52 in the pinion 38. As clearly shown in Fig. 13, the pinion 38 has teeth 23 for the same purpose as heretofore described.

The operation of the modification illustrated in Figs. 13 and 14 is identical with that heretofore described for the structure of Figs. 8 to 12 inclusive, but with this slight variation; after the starting of the engine with which the fly wheel is associated, the collar 46 will be rotated at a higher speed than the speed of rotation of the armature shaft and the collar 47 keyed thereto, so that the lug 49 on the collar 46 will be moved ahead of or away from the lug 48 on the collar 47, and will frequently remain in said spaced position after cessation of movement of the armature shaft. However, on re-energizing of the starting motor and rotation of the armature shaft, the inertia inherent in the collar 46, and the free mounting thereof as above described, coupled with the rotation of the armature shaft and the collar 47 keyed thereto, will effect reengagement of the driving lug 48 with the lug 49 in driving position.

This structure last described enables me to dispense with the use of a spring or similar means to return the lugs 49 and 48 to driving engagement, thus effecting a still further economy in the manufacture of my novel starter, as well as enabling me to increase the diameter of the armature shaft and hence its strength at this vital point.

It will be readily apparent to those skilled in this art that each of the modifications above briefly described is within the scope and range of my present invention, and the same are, therefore, included in the claims of this application.

While I have necessarily described my present invention somewhat in detail, it will be appreciated that I may vary the size, shape and arrangement of parts within reasonably wide limits, without departing from the spirit of the invention.

My invention is further described and defined in the form of claims as follows:

1. An engine starting device including a starter drive shaft, a pinion mounted for axial movement relative to said shaft, a friction clutch member carried by said pinion, a friction clutch member carried by said shaft and positively rotated thereby, means to bring said clutch members into operative engagement, and means whereby the clutch member carried by said shaft is capable of greater speed in the driving direction than said shaft at the time of starting of the engine with which said device is associated.

2. An engine starting device including a starter drive shaft, a pinion mounted for axial movement relative to said shaft, a friction clutch member carried by said pinion, a stop collar carried by said shaft and positively rotated thereby, a clutch member on said stop collar, means actuated by said armature shaft to bring said clutch members into operative engagement, and means whereby the clutch member carried by said shaft is capable of greater speed in the driving direction than said shaft at the time of starting of the engine with which said device is associated.

3. An engine starting device including a starter drive shaft, a sleeve mounted for axial movement relative to said shaft, a pinion carried by said sleeve and adapted to be moved into and out of mesh with an engine gear, primary friction clutch elements interposed between said pinion and said shaft, and a secondary friction clutch interposed between said pinion and said sleeve.

4. An engine starting device including a starter drive shaft, a pinion mounted for axial movement relative to said shaft, a pair of stop collars mounted on said shaft in tandem relationship and positively rotated thereby, said collars being fixed on said shaft against longitudinal movement, to limit the axial movement of said pinion, and cooperating friction clutch surfaces on said pinion and one of said stop collars, said last mentioned stop collar being free of direct attachment to said shaft and being capable of greater speed in the driving direction than said shaft at the time of starting of the engine with which said device is associated.

5. An engine starting device including a starter drive shaft, a sleeve mounted for axial movement relative to said shaft, a pinion carried by said sleeve and adapted to be moved into and out of mesh with an engine gear, primary friction clutch elements interposed between said pinion and said shaft, and a secondary friction clutch of a different value than said primary clutch interposed between said pinion and said sleeve.

6. An engine starting device including a starter drive shaft, a sleeve mounted for axial movement relative to said shaft, a pinion carried by said sleeve and adapted to be moved into and out of mesh with an engine gear, primary friction clutch elements interposed between said pinion and said shaft, and a secondary friction clutch of less frictional value than said primary clutch interposed between said pinion and said sleeve.

7. An engine starting device including a starter drive shaft, a sleeve mounted for axial movement relative to said shaft, a pinion carried by said sleeve and adapted to be moved into and out of mesh with an engine gear, a screw splined on said shaft and normally out of operative engagement with said sleeve, and means effective on operation of said armature shaft to operatively connect said sleeve and said screw, said screw constituting means to move said pinion into operative engagement with an engine gear and constituting, on disengagement of said pinion from said engine gear, means to guide said sleeve and pinion to normal retracted position.

8. An engine starting device including a starter drive shaft, a pinion mounted for axial movement relative to said shaft, a pair of stop collars mounted on said shaft in tandem ralationship, one of said collars being fixed to said shaft, a driving lug on said fixed collar, a lug on the other collar adapted to be engaged by said driving lug, said collars limiting axial movement of said pinion, and cooperating friction clutch surfaces on said pinion and one of said stop collars.

9. An engine starting device including a starter drive shaft, a pinion mounted for axial movement relative to said shaft, a pair of stop collars mounted on said shaft in tandem relationship, one of said collars being fixed to said shaft, a driving lug on said fixed collar, a lug on the other collar adapted to be engaged by said driving lug, resilient means to normally maintain said lugs in driving engagement, said collars limiting axial movement of said pinion, and cooperating friction clutch surfaces on said pinion and one of said stop collars.

10. An engine starting device including a starter drive shaft, a sleeve mounted for axial movement relative to said shaft, a pinion carried by said sleeve and adapted to be moved into and out of mesh with an engine gear, a pair of stop collars mounted on said shaft in tandem relationship, one of said collars being fixed to said shaft, a driving lug on said fixed collar, a lug on the other collar adapted to be engaged by said driving lug, resilient means to normally maintain said lugs in driving engagement, said collars limiting the axial movement of said pinion and sleeve, cooperating primary friction clutch surfaces on said pinion and one of said stop collars, and cooperating secondary friction clutch surfaces on said pinion and said sleeve.

11. An engine starting device including a starter drive shaft, a sleeve mounted for axial movement relative to said shaft, a pinion carried by said sleeve and adapted to be moved into and out of mesh with an engine gear, a pair of stop collars mounted on said shaft in tandem relationship, one of said collars being fixed to said shaft, a driving lug on said fixed collar, a lug on the other collar adapted to be engaged by said driving lug, resilient means to normally maintain said lugs in driving engagement, said collars limiting the axial movement of said pinion and sleeve, cooperating primary friction clutch surfaces on said pinion and one of said stop collars, and cooperating secondary friction clutch surfaces on said pinion and said sleeve, said secondary friction clutch surfaces being of less frictional value than said primary surfaces.

12. An engine starting device including a starter drive shaft, a pinion mounted for axial movement relative to said shaft, a pair of stop collars mounted on said shaft in tandem relationship, one of said collars being fixed to said shaft, a driving lug on said fixed collar, a lug on the other collar adapted to be engaged by said driving lug, said stop collars having provision for rotative movement relative to each other, resilient means to normally maintain said lugs in driving engagement, and to return said lugs to driving engagement after disengagement, and cooperating friction clutch surfaces on said pinion and one of said stop collars.

13. An engine starting device including a starter drive shaft, a sleeve mounted for longitudinal movement relative to said shaft, said sleeve being internally threaded throughout a portion of its length and having a recess communicating with said threaded portion, a pinion mounted for longitudinal movement relative to said shaft and adapted to be moved into and out of mesh with an engine gear, a pair of stop collars mounted on said shaft in tandem relationship, cooperating friction clutch, elements carried by said pinion and one of said stop collars, a screw normally housed in said recess and splined to said shaft, resilient means to operatively connect said screw to said sleeve on rotation of said shaft, rotation of said shaft effecting rotation of said screw and, after operative connection of said screw and sleeve, a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means to limit the movement of said screw.

14. An engine starting device including a starter drive shaft, a sleeve mounted for longitudinal movement relative to said shaft, said sleeve being internally threaded throughout a portion of its length and having a recess communicating with said threaded portion, a pinion mounted for longitudinal movement relative to said shaft and adapted to be moved into and out of mesh with an engine gear, a pair of stop collars mounted on said shaft in tandem relationship, cooperating primary friction clutch elements carried by said pinion and one of said stop collars, a secondary friction clutch interposed between the said sleeve and the said pinion, a screw normally housed in said recess and splined to said shaft, resilient means to operatively connect said screw to said sleeve on rotation of said shaft, rotation of said shaft effecting rotation of said screw and, after operative connection of said screw and sleeve, a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means to stop movement of said screw when said torque has reached a determined fixed limit.

15. An engine starting device including a starter drive shaft, a sleeve mounted for longitudinal movement relative to said shaft, said sleeve being internally threaded throughout a portion of its length and having a recess communicating with said threaded portion, a pinion mounted for longitudinal movement relative to said shaft and adapted to be moved into and out of mesh with an engine gear, a pair of stop collars mounted on said shaft in tandem relationship, cooperating friction clutch elements carried by said pinion and one of said stop collars, a screw normally housed in said recess and splined to said shaft, resilient means to operatively connect said screw to said sleeve on rotation of said shaft, rotation of said shaft effecting rotation of said screw and, after operative connection of said screw and sleeve, a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means to limit movement of said screw.

16. An engine starting device including a starter drive shaft, a sleeve mounted for longitudinal movement relative to said shaft, said sleeve being internally threaded throughout a portion of its length and having a recess communicating with said threaded portion, a pinion mounted for longitudinal movement relative to said shaft and adapted to be moved into and out of mesh with an engine gear, a screw normally housed within said recess and splined to said shaft, said sleeve being rotatable about said screw when so housed, resilient means to operatively connect said screw to said sleeve on rotation of said shaft, rotation of said shaft effecting rotation of said screw and, after operative connection of said screw and sleeve, a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means to stop movement of said screw when said torque has reached a determined fixed limit.

17. An engine starting device including a starter drive shaft, a sleeve mounted for longitudinal movement relative to said shaft, said sleeve being internally threaded, a pinion mounted for longitudinal movement relative to said shaft and adapted to be moved into and out of mesh with an engine gear, a friction clutch interposed between the said sleeve and the said pinion, a screw splined to said shaft, rotation of said shaft effecting rotation of said screw and a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring and a progressive development of torque on said pinion through said friction clutch, and means to stop movement of said screw when said torque has reached a determined fixed limit.

18. An engine starting device including a starter drive shaft, a sleeve mounted for longitudinal movement relative to said shaft, said sleeve being internally threaded throughout a portion of its length and having a recess communicating with said threaded portion, a pinion mounted for longitudinal movement relative to said shaft and adapted to be moved into and out of mesh with an engine gear, a screw normally housed within said recess and splined to said shaft, resilient means to operatively connect said screw to said sleeve on rotation of said shaft, rotation of said shaft effecting rotation of said screw and, after operative connection of said screw and sleeve, a movement of said sleeve and said pinion longitudinally of said shaft until said pinion is in mesh with said engine gear, a coiled spring surrounding said shaft and engaged by said screw, continued rotation of said screw after meshing of said pinion with said engine gear effecting a compression of said spring, said screw, on disengagement of said pinion from said engine gear, returning to normal position in said recess and permitting rotation of said sleeve therearound.

19. An engine starting device including a starter drive shaft, a pinion mounted for axial movement relative to said shaft, a pair of stop collars mounted on said shaft in tandem relationship, one of said collars being fixed to said shaft, cooperating positive driving elements on said collars, said collars limiting axial movement of said pinion, and cooperating friction clutch elements on said pinion and one of said stop collars.

20. An engine starting device including a starter drive shaft, a pinion mounted for axial movement relative to said shaft, a pair of stop members mounted on said shaft in tandem relationship, one of said members being fixed to said shaft, cooperating positive driving elements on said members, said members limiting axial movement of said pinion, and cooperating friction clutch elements on said pinion and one of said members.

21. An engine starting device including a starter drive shaft, a pinion mounted for axial movement relative to said shaft, a pair of stop members mounted on said shaft in tandem relationship and having provision for rotative movement relative to each other, means to limit said relative rotative movement, one of said members being fixed to said shaft, cooperating driving elements on said members, said members limiting axial movement of said pinion, and cooperating friction clutch elements on said pinion and one of said members.

22. An engine starting device including a starter drive shaft, a pinion mounted for axial movement relative to said shaft, a pair of pinion stop members mounted on said shaft in tandem relationship, and means to positively rotate said members, one of said members being rotatably mounted on said shaft and having capacity for limited rotative movement relative to the other of said members in the driving direction on starting of the engine with which said device is associated.

23. An engine starting device including a starter drive shaft, a pinion mounted for axial movement relative to said shaft, a pinion stop member rotatably mounted on said shaft, and means driven by said shaft to effect positive rotation of said stop member in the driving direction, said member being free of direct attachment to said shaft and thus having capacity for rotative movement relative to said driving means in the driving direction on starting of the engine with which said device is associated.

24. An engine starting device including a starter drive shaft, a pinion mounted for axial movement relative to said shaft, a pinion stop member surrounding said shaft, means actuated by said shaft to effect positive rotation of said stop member in the driving direction, and means whereby said stop member is capable of greater speed in the driving direction than the speed of rotation of the said shaft and driving means at the time of starting of the engine with which said device is associated.

25. An engine starting device including a starter drive shaft, a pinion mounted for axial movement relative to said shaft, a pinion stop member surrounding said shaft, means actuated by said shaft to effect positive rotation of said stop member in the driving direction, means whereby said stop member is capable of greater speed in the driving direction than the speed of rotation of the said shaft and driving means at the time of starting of the engine with which said device is associated, and means to restore said member and its driving means to driving relation.

GEORGE A. TAYLOR.